US012463320B2

(12) United States Patent
Lee et al.

(10) Patent No.: US 12,463,320 B2
(45) Date of Patent: Nov. 4, 2025

(54) ANTENNA STRUCTURE AND ELECTRONIC DEVICE COMPRISING SAME

(71) Applicant: Samsung Electronics Co., Ltd., Suwon-si (KR)

(72) Inventors: Bumhee Lee, Suwon-si (KR); Yoongeon Kim, Suwon-si (KR); Seungho Choi, Suwon-si (KR); Sanghoon Park, Suwon-si (KR); Seokmin Lee, Suwon-si (KR); Youngju Lee, Suwon-si (KR); Joon Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 18/186,554

(22) Filed: Mar. 20, 2023

(65) Prior Publication Data

US 2023/0231296 A1 Jul. 20, 2023

Related U.S. Application Data

(63) Continuation of application No. PCT/KR2021/012967, filed on Sep. 23, 2021.

(30) Foreign Application Priority Data

Sep. 21, 2020 (KR) ........................ 10-2020-0121842

(51) Int. Cl.

| | |
|---|---|
| ***H01Q 1/22*** | (2006.01) |
| ***H01Q 21/00*** | (2006.01) |
| ***H01Q 21/06*** | (2006.01) |

(52) U.S. Cl.

CPC ....... *H01Q 1/2283* (2013.01); *H01Q 21/0087* (2013.01); *H01Q 21/065* (2013.01)

(58) Field of Classification Search

CPC ........ H01Q 1/2283; H01Q 1/246; H01Q 1/46; H01Q 9/0407; H01Q 9/045; H01Q 21/0087; H01Q 21/06; H01Q 21/065; H04B 7/0413

See application file for complete search history.

(56) References Cited

U.S. PATENT DOCUMENTS

| | | | |
|---|---|---|---|
| 6,333,719 | B1 | 12/2001 | Varadan et al. |
| 9,190,732 | B2 | 11/2015 | Fujii et al. |

(Continued)

FOREIGN PATENT DOCUMENTS

| | | | |
|---|---|---|---|
| CN | 106486741 | A | 3/2017 |
| CN | 105226390 | B | 11/2017 |

(Continued)

OTHER PUBLICATIONS

Mak et al.; A 5G Wideband Patch Antenna With Antisymmetric L-shaped Probe Feeds; IEEE Transactions on Antennas and Propagation; vol. 66, No. 2; Feb. 2018.

(Continued)

*Primary Examiner* — Raymond R Chai

(74) *Attorney, Agent, or Firm* — Jefferson IP Law, LLP

(57) ABSTRACT

The disclosure relates to a $5^{th}$ generation (5G) or pre-5G communication system for supporting a data transmission rate higher than that of a $4^{th}$ generation (4G) communication system such as long term evolution (LTE). An electronic device including an antenna in a wireless communication system is provided. The electronic device includes a radiator, a body, and a feeding circuit for transmitting a signal, wherein the radiator is coupled to at least a part of the body, the feeding circuit is coupled to the body to support the body, and the radiator is disposed to be spaced apart from the feeding circuit to form an air gap.

17 Claims, 15 Drawing Sheets

(56) References Cited

U.S. PATENT DOCUMENTS

| | | | | |
|---|---|---|---|---|
| 9,620,464 | B2 | 4/2017 | Baks et al. | |
| 10,797,397 | B2 | 10/2020 | Kim et al. | |
| 10,992,062 | B2 | 4/2021 | Liu et al. | |
| 11,101,549 | B2 | 8/2021 | Baek et al. | |
| 11,183,771 | B2 | 11/2021 | Yokokawa et al. | |
| 11,394,130 | B2 | 7/2022 | Cho et al. | |
| 2004/0217910 | A1* | 11/2004 | Montgomery | H01Q 1/36 343/770 |
| 2008/0030422 | A1* | 2/2008 | Gevargiz | H01Q 3/26 343/860 |
| 2009/0201211 | A1 | 8/2009 | Saily | |
| 2017/0324163 | A1 | 11/2017 | Foo | |
| 2019/0044238 | A1 | 2/2019 | Schuhler et al. | |
| 2019/0326675 | A1* | 10/2019 | Kim | H01Q 25/001 |
| 2020/0259267 | A1 | 8/2020 | Park et al. | |
| 2022/0278452 | A1* | 9/2022 | Kim | H01Q 1/243 |
| 2024/0322456 | A1* | 9/2024 | Vladimir | H01Q 1/50 |

FOREIGN PATENT DOCUMENTS

| | | | |
|---|---|---|---|
| CN | 107749511 | A | 3/2018 |
| CN | 108777353 | A | 11/2018 |
| CN | 109524778 | A | 3/2019 |
| CN | 209282396 | U | 8/2019 |
| EP | 3 327 865 | B1 | 9/2019 |
| JP | H9-102709 | A | 4/1997 |
| JP | 2004-247965 | A | 9/2004 |
| JP | 2009-89428 | A | 4/2009 |
| JP | 2013-201515 | A | 10/2013 |
| KR | 10-2006-0059437 | A | 6/2006 |
| KR | 10-2006-0071770 | A | 6/2006 |
| KR | 10-0959823 | B1 | 5/2010 |
| KR | 10-2019-0088682 | A | 7/2019 |
| KR | 10-2019-0121661 | A | 10/2019 |
| WO | 2019/064683 | A1 | 4/2019 |
| WO | 2020/134362 | A1 | 7/2020 |
| WO | 2020/182316 | A1 | 9/2020 |

OTHER PUBLICATIONS

International Search Report with written Opinion and English translation dated Jan. 13, 2022; International Appln. No. PCT/KR2021/012967.

Extended European Search Report dated Feb. 5, 2024; European Appln. No. 21869824.9-1205 / 4207488 PCT/KR2021012967.

Korean Office Action with English translation dated Aug. 6, 2024; Korean Appln. No. 10-2020-0121842.

Korean Office Action with English translation dated Apr. 7, 2025; Korean Appln. No. 10-2020-0121842.

European Office Action dated Sep. 16, 2025, issued in European Patent Application No. 21869824.9.

* cited by examiner

620

ANTENNA STRUCTURE AND ELECTRONIC DEVICE COMPRISING SAME

CROSS-REFERENCE TO RELATED APPLICATION(S)

This application is a continuation application, claiming priority under § 365 (c), of an International Application No. PCT/KR2021/012967, filed on Sep. 23, 2021, which is based on and claims the benefit of a Korean patent application number 10-2020-0121842, filed on Sep. 21, 2020, in the Korean Intellectual Property Office, the disclosure of which is incorporated by reference herein in its entirety.

BACKGROUND

1. Field

The disclosure relates to a wireless communication system. More particularly, the disclosure relates to an antenna structure in a wireless communication system and an electronic device including same.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency (millimeter wave (mmWave)) bands (e.g., 60 gigahertz (GHz) bands) so as to accomplish higher data rates. To decrease propagation loss of the radio waves and increase transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna structure for a broadband characteristic through a low permittivity in a wireless communication system and an electronic device including same.

Additional aspects will be set forth in part in the description which follows and, in part, will be apparent from the description, or may be learned by practice of the presented embodiments.

In accordance with an aspect of the disclosure, an electronic device including an antenna in a wireless communication system is provided. The electronic device includes a radiator, a body, and a feeding circuit for transmitting a signal, wherein the radiator is coupled to at least a part of the body, the feeding circuit is coupled to the body to support the body, and the radiator is disposed to be spaced apart from the feeding circuit to form an air gap.

In accordance with another aspect of the disclosure, a massive multiple input multiple output (MIMO) unit (MMU) device is provided. The MMU device includes at least one processor, a feeding network, and a sub-array including a plurality of antenna elements, wherein each of the antenna elements of the sub-array includes a body, a radiator coupled to at least a part of the body, and a feeding circuit coupled to the body to support the body, and wherein the radiator is disposed to be spaced apart from the feeding circuit to form an air gap.

A device and a method according to various embodiments of the disclosure may provide a broadband characteristic by forming an air gap between a feeding circuit and a radiator.

Other aspects, advantage, and salient features of the disclosure will become apparent to those skilled in the art to from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
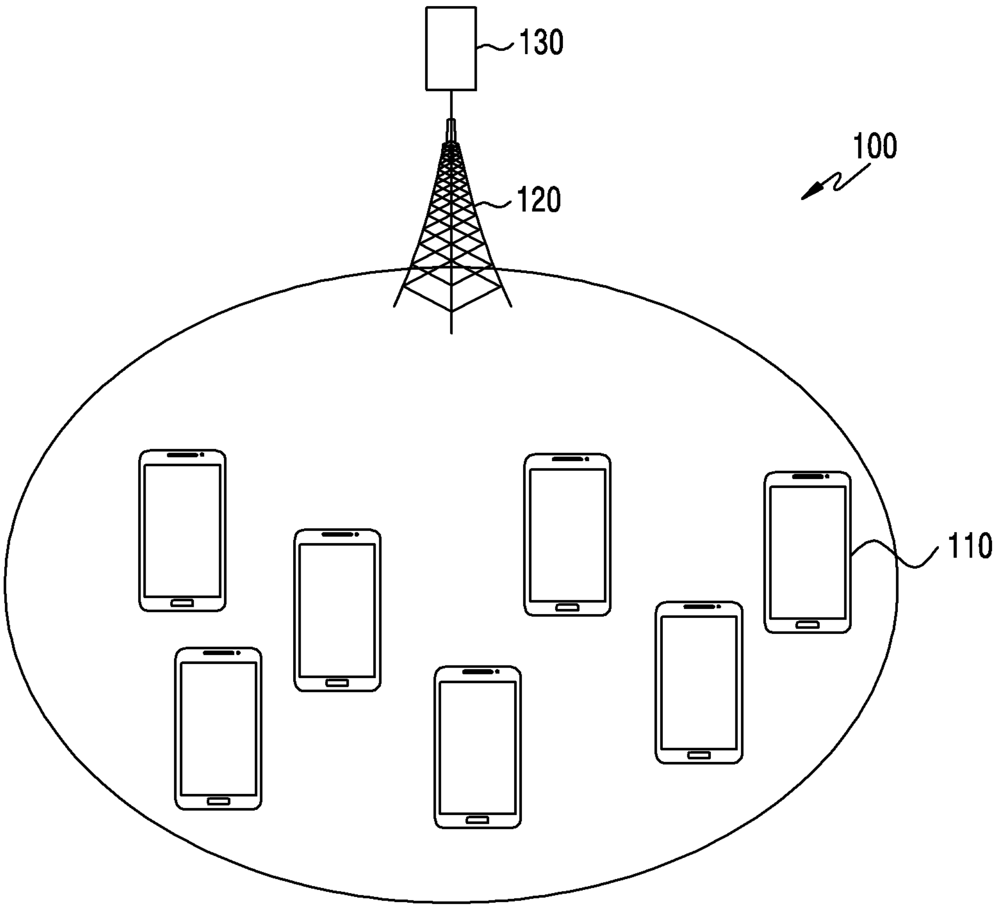
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and are not intended to limit the disclosure. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an antenna structure and an electronic device including same in a wireless communication system. Specifically, the disclosure describes a technology for reducing a permittivity by forming an air gap between a feeding circuit (or, feeding unit) and a radiator when designing an antenna element in a wireless communication system and securing a broadband characteristic through a low permittivity.

In the description below, terms referring to electronic device components (e.g., substrate, printed circuit board (PCB), flexible PCB (FPCB), antenna, antenna element, circuit, processor, chip, element, and device), terms referring to component shapes (e.g., structural body, structure, support, contact, and protrusion), terms referring to connections between structures (e.g., connection part, contact part, support part, contact structure, conductive member, and assembly), terms referring to circuits (e.g., PCB, FPCB, signal line, feeding line, data line, radio frequency (RF) signal line, antenna cable, RF path, RF module, and RF circuit), and the like are illustratively used for the convenience of description. Therefore, the disclosure is not limited by the terms as used below, and other terms referring to subjects having equivalent technical meanings may be used. Furthermore, as used below, the terms "unit", "device", "member", "body", and the like may indicate at least one shape structure or may indicate a unit for processing a function.

In the disclosure, various embodiments will be described using terms employed in some communication standards (e.g., the 3rd generation partnership project (3GPP)), but they are only for the sake of illustration. The embodiments of the disclosure may also be easily applied to other communication systems through modifications.

FIG. 1 illustrates a wireless communication system according to an embodiment of the disclosure. The wireless communication environment 100 shown FIG. 1 shows an example of a base station 120 and a terminal 110 as parts of a node using a wireless channel.

Referring to FIG. 1, the wireless communication environment 100 may include the base station 120 and the terminal 110.

The base station 120 corresponds to a network infrastructure for providing wireless access to the terminal 110. The base station 120 has a coverage defined as a predetermined geographic area based on a distance in which a signal is transmittable. The base station 120 may be referred to as a massive multiple input multiple output (MIMO) unit (MMU), "an access point (AP)", "an eNodeB (eNB)", "a 5$^{th}$ generation node", "a 5$^{th}$ generation (5G) NodeB (NB)", "a wireless point", "a transmission/reception point (TRP)", "an access unit", "a digital unit (DU)", "a transmission/reception point (TRP)", "a radio unit (RU)", a remote radio head (RRH), or other names having a technical meaning equivalent thereto, in addition to a base station. The base station 120 may transmit a downlink signal or receive an uplink signal.

The terminal 110 is a device used by a user and performs communication with the base station 120 through a wireless channel. In some cases, the terminal 110 may be operated without involvement of a user. That is, the terminal 110 may be a device for performing machine type communication (MTC) and not carried by a user. The terminal 110 may be referred to as "a user equipment (UE)", "a mobile station", "a subscriber station", "a customer-premises equipment (CPE)", "a remote terminal", "a wireless terminal", "an electronic device", "a vehicle terminal", "a user device", or another term having a technical meaning equivalent thereto, in addition to a terminal.

A beamforming technology is used as one of technologies for reducing propagation path loss and increasing a radio propagation distance. Generally, beamforming uses a plurality of antennas to concentrate the arrival area of radio waves, or increase the directivity of reception sensitivity in a specific direction. Therefore, the base station 120 may include a plurality of antennas to form a beamforming coverage instead of forming a signal in an isotropic pattern by using a single antenna. Hereinafter, an antenna array including a plurality of antennas will be described. The example of the antenna array described herein is merely an example for explaining embodiments of the disclosure and is not construed to delimit other embodiments of the disclosure.

The base station 120 may include beamforming equipment 130. According to an embodiment, as the beamforming equipment, the base station 120 may include a massive MIMO unit (MMU) including an antenna array. Each antenna included in an antenna array may be referred to as an array element or an antenna element. The antenna array may be described as a two-dimensional planar array, but this is merely an embodiment and does not limit other embodiments of the disclosure. According to another embodiment, the antenna array may be configured as various forms, such as a linear array. An antenna array may be referred to as a massive antenna array.

A main technology to improve the data capacity of 5G communication is a beamforming technology using an antenna array connected to a plurality of RF paths. For higher data capacity, the number of RF paths needs to increase or power per RF path needs to increase. Increase of RF paths may cause increase in a product size and due to space constraints in installing, actual base station equipment is currently at a level that may no longer be increased. In order to increase an antenna gain through a high output while not increasing the number of RF paths, a plurality of antenna elements are connected by using a splitter (or divider) on an RF path to increase an antenna gain.

The number of antennas (or antenna elements) of equipment (e.g., the base station 120) for performing wireless communication has been increased to improve communication performance. Furthermore, the number of RF parts (e.g., an amplifier and a filter) and components for processing an RF signal received or transmitted through an antenna element has been increased and thus a spatial gain and cost efficiency are essentially required in configuring a communication device in addition to satisfying communication performance.

To serve more users in a cell, support for a wider bandwidth is required. To this end, broadband base station equipment is required and a broadband antenna is essential to implement the broadband base station equipment. There is a difficulty in designing a broadband antenna. A wide reflection coefficient and a beam characteristic required within a band need to be satisfied. Due to characteristics of a base station installed on high ground, an antenna beam is fixedly directed toward the ground as well as the physical base station radiation angle adjustment (e.g., tilt). A predetermined phase difference between antenna elements needs to be realized through a feeding network to direct the antenna beam to the ground. A broadband antenna is necessary for a design of a feeding network to have an ideal phase difference. Actually, when the broadband antenna is not used, a base station coverage may not be secured. A grating lobe may occur or the coverage may be easily distorted. To address the aforementioned problems, hereinafter, embodiments of the disclosure suggest an antenna structure which may cover a broad frequency band and have less distortion in coverage performance.

Figure 2:
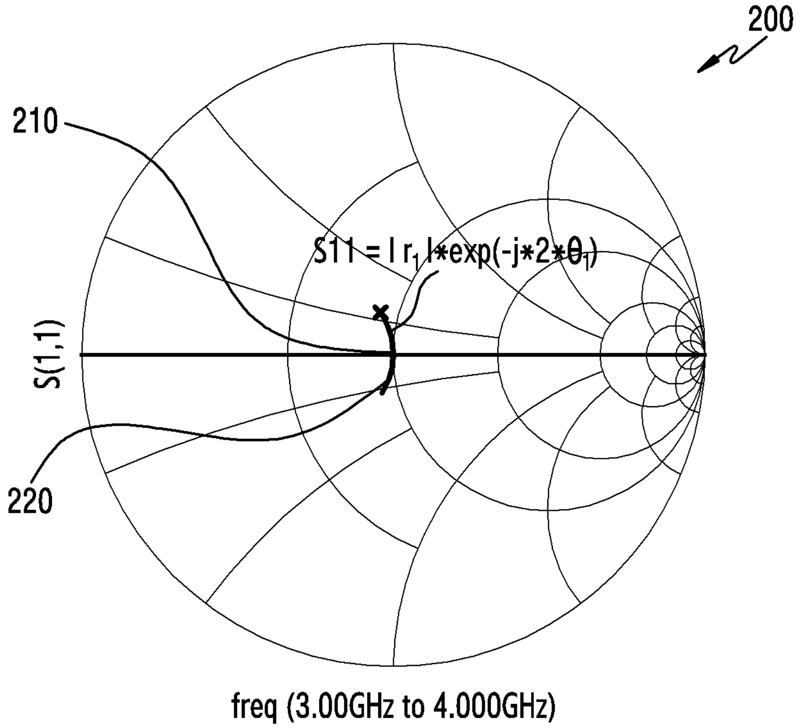
FIG. 2 is a view illustrating an example of a broadband characteristic according to an embodiment of the disclosure.

FIG. 2 is a view illustrating an example of a broadband characteristic according to an embodiment of the disclosure.

Referring to FIG. 2, a Smith chart 200 is a Smith chart related to a reflection coefficient. The reflection coefficient is a S-parameter and means $S_{11}$. Here, a curve 220 on the Smith chart 200 may be expressed as an equation below.

$$S_{11}=|\Gamma|e^{-j2\theta_1} \qquad \text{Equation 1}$$

Here, $\Gamma$ indicates a reflection coefficient at a reference point 210, and $\theta_1$ indicates a phase change amount. A characteristic for covering a broad frequency band, that is, a broadband characteristic represents a relatively small change in antenna characteristic over corresponding frequency bands. That is, even if a frequency is changed, the more constant the antenna characteristic is, the better the broadband characteristic may be. Accordingly, it may be understood that if a variation of $S_{11}$ according to a frequency is low, a broadband characteristic is high. To examine a relationship between frequency and phase, first, the phase constant may be expressed by the following equation.

$$\beta=\frac{\theta}{L} \qquad \text{Equation 2}$$

$\beta$ indicates a phase constant and means an amount of phase change per unit length traveled by a wave. $\theta$ indicates a phase and L indicates a length.

A phase velocity may be expressed as the following equation.

$$v_p=\frac{w}{\beta}=\frac{2\pi\cdot f}{\beta}=\frac{1}{\sqrt{\varepsilon\cdot\mu}} \qquad \text{Equation 3}$$

$v_p$ indicates a phase velocity, w indicates each frequency, f indicates a frequency, $\varepsilon$ indicates a permittivity, and $\mu$ indicates a permeability.

The following equation may be derived through Equation 2 and Equation 3.

$$\theta=2\pi\cdot\sqrt{\varepsilon\cdot\mu}\cdot L\cdot f \qquad \text{Equation 4}$$

$\theta$ indicates a phase, L indicates a length, f indicates a frequency, $\varepsilon$ indicates a permittivity, and $\mu$ indicates a permeability. Considering a relationship between a frequency and a phase, in order for a phase variation to a frequency change to be small, it is required that a part $A=2\pi\cdot\sqrt{\varepsilon\cdot\mu}\cdot L$ for a coefficient be small. Hereinafter, the disclosure uses a permittivity $\varepsilon$ as a regulating factor for a coefficient part A. In other words, an antenna structure having a low permittivity is proposed.

With respect to the air, $\varepsilon_r=1$ and thus a coefficient is $A_0=2\pi\cdot\sqrt{\varepsilon_0\cdot\mu}\cdot L$. With respect to a dielectric, $\varepsilon_r>1$ and thus a coefficient is $A_1=2\pi\cdot\sqrt{\varepsilon_{r1}\cdot\varepsilon_0{\sim}\mu}\cdot L$. Since the coefficient of the air is lower, it may be identified that a variation according to a frequency is small. Since $A_1>A_0$, an air gap is required to be form for a broadband characteristic. Hereinafter, a design principle of a gap patch antenna of the disclosure will be described with reference to FIG. 3.

Figure 3:
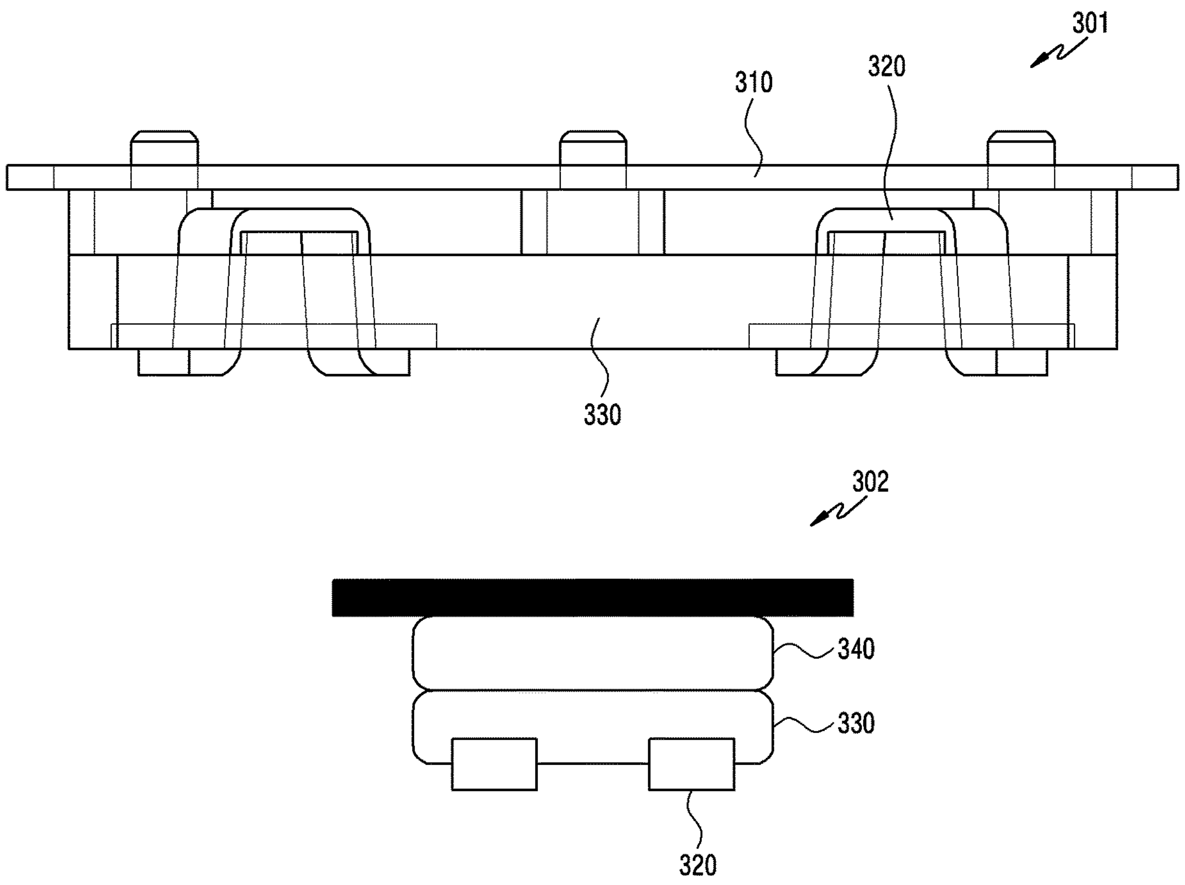
FIG. 3 illustrates an example of a gap patch structure according to an embodiment of the disclosure.

FIG. 3 illustrates an example of a gap patch structure according to an embodiment of the disclosure. In the disclosure, the gap patch structure represents a structure for providing a low permittivity through an air gap between a feeding circuit and a radiator. A specific example of the structure will be described with reference to FIG. 3.

Referring to FIG. 3, a sectional view 301 shows an example of a section of a gap patch structure. A sectional view 302 shows another example of a section of the gap patch structure. The gap patch structure may include a patch 310, a feeding circuit 320, and a dielectric 330. In this case, the patch 310 is a radiation element and may be configured to radiate an electric signal to the air. The feeding circuit 320 corresponds to a component for feeding an electric signal to a radiator and may include feeding lines transferred through a signal processing. For example, the feeding circuit 320 may be formed of a metal. The feeding circuit 320 may concurrently serve as a support and perform signal transfer. According to an embodiment, the feeding circuit 320 may transfer an electric signal to the patch 310 through coupling feeding. The dielectric 330 may be configured to be coupled to the feeding circuit to transfer a charge. According to an embodiment, the dielectric 330 may be disposed to fix the feeding circuit 320.

According to the principle described in FIG. 2, a structure in which an air gap 340 is formed to reduce a change in antenna characteristic according to a change in frequency by lowering a permittivity in a region through within which a signal is transmitted is exemplified. The structure may be referred to as a gap patch structure. The gap patch structure means a structure in which an air gap exists between the patch 310 and the feeding circuit 320, that is, a structure in which an area (or layer) having no separate dielectric exists.

Figure 4:
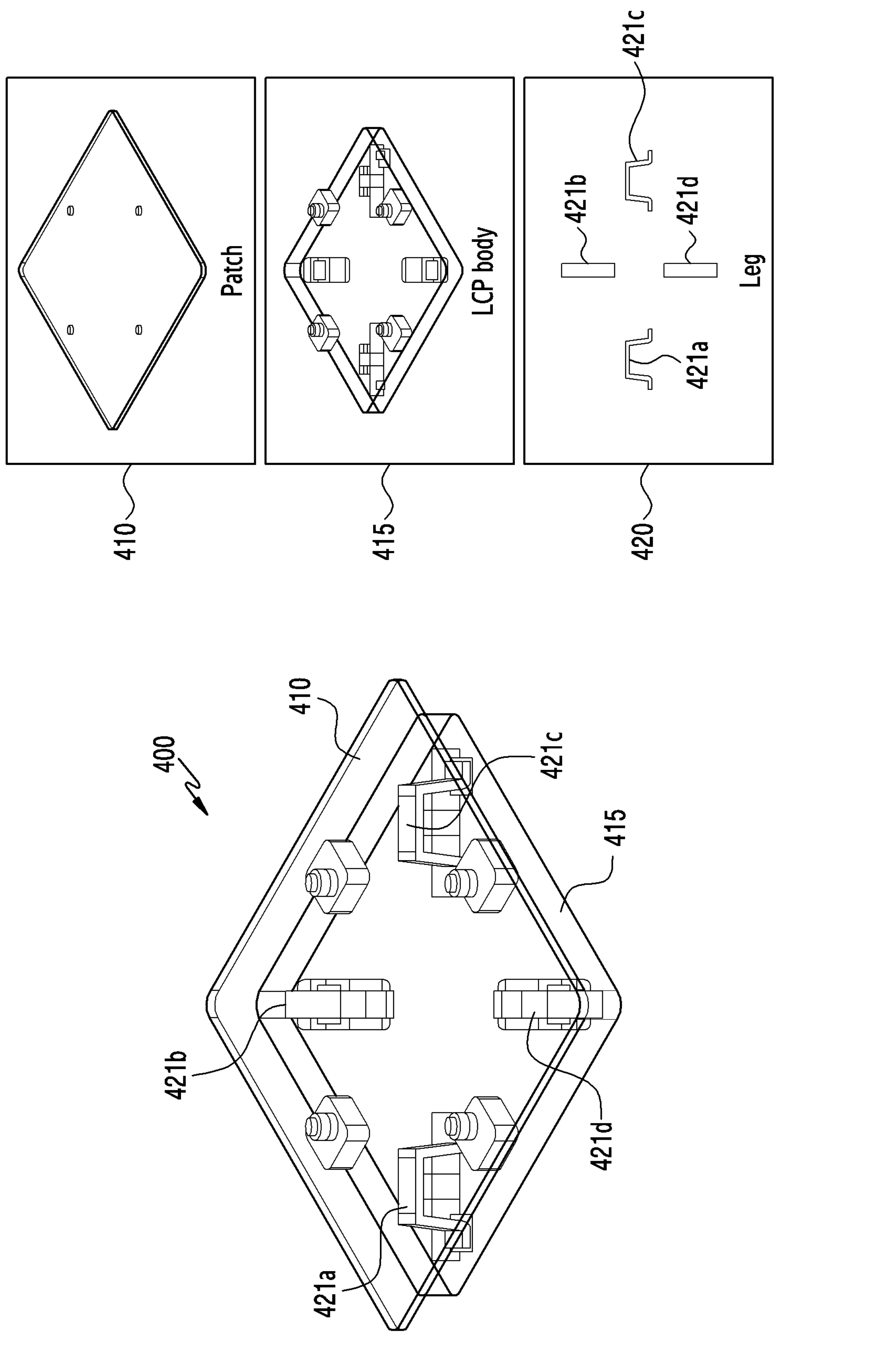
FIG. 4 illustrates an example of an antenna having a gap patch structure according to an embodiment of the disclosure.

FIG. 4 illustrates components of an antenna having a gap patch structure according to an embodiment of the disclosure. The gap patch structure means a structure in which a region without a dielectric is secured in a section between a feeding circuit and a radiator of an antenna, that is, a coupling section.

An antenna 400 may include a patch 410, a support 415, and a feeding circuit 420. The patch 410 is a patch antenna and may function as a radiator. The patch 410 may radiate a signal transferred from the feeding circuit 420 into the air. According to an embodiment, the patch 410 may be configured by a metal radiator. According to an embodiment, the patch 410 may be fixed to the support 415 to be described below through a heat fusion method.

The support 415 represents a body (e.g., a liquid crystal polymer (LCP) body) of the antenna element. The support 415 may have a low permittivity structure. According to an embodiment, the support 415 may include a dielectric and the air as a medium. In this case, the dielectric of the support 415 may be disposed to fix a leg of the feeding circuit to be described. According to an embodiment, the support 415 may be formed by an injection forming method (e.g., insert injection). A specific production method will be described with reference to FIG. 8.

The support 415 may be disposed to support the patch 410. To this end, at least one area of the support 415 may include a protrusion to form a higher height than a dielectric area for forming an air gap. The support 415 may be coupled to the radiator through the protrusion. The protrusion of the support 415 may serve as a pillar for supporting the radiator. According to an embodiment, the support 415 may fix the radiator through the protrusion in a production processing process such as a heat fusion method.

The feeding circuit 420 may be attached to a printed circuit board (PCB) and may transfer a signal transferred from feeding lines to the patch 410 through coupling feeding. According to an embodiment, the feeding circuit 420 may function as an isolator. The feeding circuit 420 may function as a support in addition to performing feeding. The feeding circuit 420 may include a leg-shape support for a stable structure. According to an embodiment, for stable support, the feeding circuit 420 may be configured in a form of a "⊏"-shaped leg. Hereinafter, for convenience of explanation, the "⊏"-shaped feeding circuit is described as an example, the shape of the feeding circuit 420 is not limited to the "⊏" shape in embodiments of the disclosure. For example, the feeding circuit 420 may include a "¬"-shaped leg.

The feeding circuit 420 may include a plurality of leg-shaped supports for a stable structure. For example, the feeding circuit 420 may include four leg-shaped supports. The feeding circuit 420 may include a first leg-shaped support 421*a*, a second leg-shaped support 421*b*, a third leg-shaped support 421*c*, and a fourth leg-shaped support 421*d*. FIG. 4 illustrates four leg-shaped supports as an example, but this is merely an embodiment of the disclosure without excluding other implementation variations. For example, the feeding circuit 420 may include two leg-shaped supports. For example, the feeding circuit 420 may include eight leg-shaped supports. Here, each leg-shaped support may be disposed to be substantially symmetrical based on the center of the patch 410 for stable arrangement. Although not shown in FIG. 4, the feeding circuit 420 may be fixed to the PCB or a dielectric board (i.e., a feeding network) through the leg-shaped supports. The leg-shaped supports may be attached to a corresponding board through a surface mounted technology (SMT). In this case, as an example, the leg-shaped supports of the feeding circuit 420 may be subjected to plating processing.

The leg-shaped supports may be designed to have a structure for feeding. Each leg-shaped support may perform a feeding function. The leg-shaped support may be referred to as a feeding leg. According to an embodiment, all leg-shaped supports of the feeding circuit 420 may be configured to feed a signal. Hereinafter, for convenience of explanation, the leg-shaped support is described as the feeding leg as an example of the feeding circuit 420 in the disclosure, but embodiments of the disclosure are not limited thereto. In some other embodiments, a partial group of the leg-shaped supports of the feeding circuit 420 may be configured to feed a signal and another group thereof may be included just for a support function.

According to an embodiment, the feeding circuit 420 may be configured to provide dual polarization. Signals having different polarizations may be transferred to the patch 410 through two feeding lines. In this case, polarization (i.e., a co-pol component) of a signal transferred by a first feeding leg and polarization (co-pol component) of a signal transferred by a second feeding leg may be orthogonal to each other. The feeding legs of the feeding circuit 420 may be arranged considering the dual polarization. An embodiment of the dual polarization may be combined with the aforementioned embodiment. By way of example, two from among four leg-shaped supports area feeding legs and the other may be structures for supporting between a radiator and the PCB. In addition, leg-shaped supports for performing a feeding function may be arranged to provide the dual-polarization.

As for the arrangement and number of leg-shaped supports, inclusion of leg-shaped supports in feeding lines, or the like, various modifications other than the above-described examples may be allowed within a range that does not deviate from the gap patch structure, the characteristic of the disclosure.

An example of components of an antenna having a gap patch structure is illustrated in FIG. 4. Hereinafter, with reference to FIG. 5, a method for forming a gap patch structure through coupling of components will be described.

Figure 5:
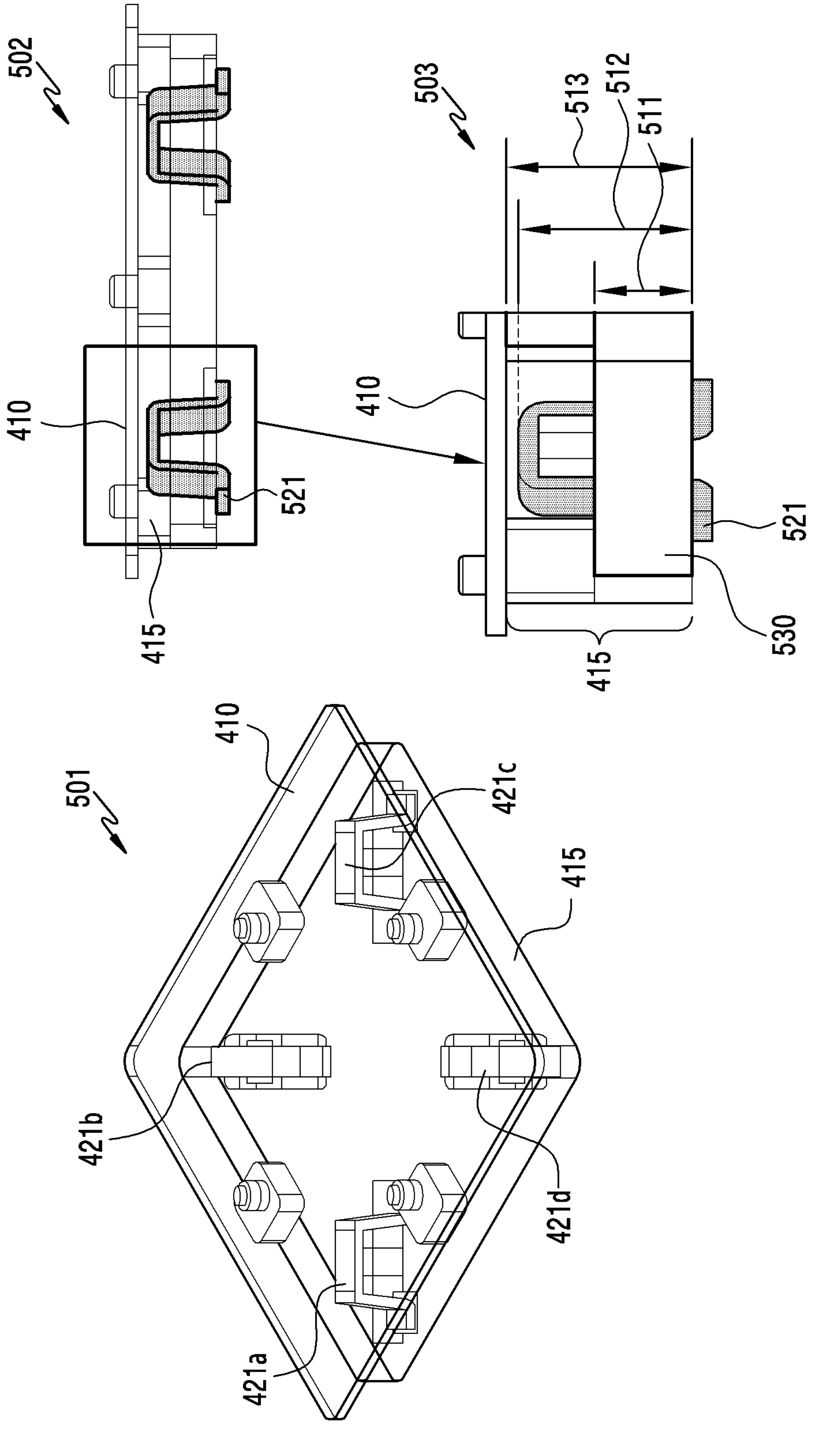
FIG. 5 illustrates components of an antenna having a gap patch structure according to an embodiment of the disclosure.

FIG. 5 illustrates an example of an antenna having a gap patch structure according to an embodiment of the disclosure. The gap patch structure means a structure in which a region without a dielectric is secured in a section between a feeding circuit and a radiator of an antenna, that is, a coupling section. The antenna 400 in FIG. 4 is exemplified as the antenna having a gap patch structure.

Referring to FIG. 5, a perspective view 501 illustrates an example in which components of the antenna 400 having the gap patch structure are coupled. A sectional view 502 illustrates an example of a section of the antenna 400. An enlarged view 503 illustrates the gap patch structure shown in the section of the antenna 400. The components may include a patch 410, a support 415, and a feeding circuit 420.

Referring to the enlarged view 403, the support 415 may include a dielectric 530. The feeding circuit 420 may include a feeding leg 521.

In order to explain the gap patch structure, a term indicating a gap is defined first. A height is defined based on one surface of a body (hereinafter, referred to as a reference surface). A height of the feeding leg 521 may be defined as a first height 511. A height of the dielectric 530 may be defined as a second height 512. The dielectric 530 may be a component of an antenna body. A height of the patch 410 may be defined as a third height 513. The height of the patch 410 indicates a gap between the patch 410 and the reference surface in case that the support 415 of the patch 410 is coupled (e.g., a heat fusion method) to the structure to be fixedly disposed.

The gap patch structure indicates a structure having a gap between a radiator (e.g., the patch 410) and a feeding body (e.g., the feeding leg 521). The gap indicates an air gap having a low permittivity. Accordingly, according to an embodiment, the first height 511 needs to be lower than the third height 513. The reason is because a difference between the first height 511 and the third height 513 is the gap. Therefore, when the patch 410 is coupled to the support 415, for example, in case that the patch 410 is coupled to the support 415 through heat fusion press, the process may be performed so that the third height 513 is formed higher than the first height 511. However, this is merely an example of a production process order, and in case that the third height 513 is determined first and then the first height 511 is determined, a process may be performed so that a feeding leg is formed to have a height lower than a designated range, that is, the third height 513.

In addition, according to an embodiment, in order to form a stable air gap, the dielectric needs to be disposed below the first height 511, which is the height at which the air gap begins. That is, the second height 512 needs to be lower than the first height 511. The support 415 may be formed to allow the dielectric 530 to be inserted into a position lower than the first height 511.

The antenna 400 in which the patch 410, the support 415, and the feeding leg 521 are coupled in the aforementioned manner may be mounted on a PCB (e.g., referred to as an antenna board or feeding network board) through SMT. The dielectric 530 may be fixed in the support 415. The antenna produced in this manner may correspond to an antenna element in an array antenna. A set of antenna elements may form a sub-array (e.g., n×1 sub-array, where n is an integer greater than or equal to 2). The sub-array may form a beam through coupling with a feeding network (e.g., a power divider). The beam may be formed in various manners by adjusting a phase through length adjustment of the power divider. Here, the sub-array may provide a stable frequency characteristic in a broadband due to an air gap formed between the antenna element and the feeding circuit. The stable frequency band may provide improvement in coverage and throughput.

Hereinafter, an example of performance of an antenna having a gap patch structure will be described through graphs with reference to FIGS. 6A to 6D.

FIGS. 6A, 6B, 6C, and 6D depict graphs indicating antenna performance of an antenna having a gap patch structure according to various embodiments of the disclosure. The gap patch structure means a structure in which a region without a dielectric is secured in a section between a feeding circuit and a radiator of an antenna, that is, a coupling section. The antenna 400 in FIG. 4 is exemplified as the antenna having a gap patch structure.

Figure 6A:
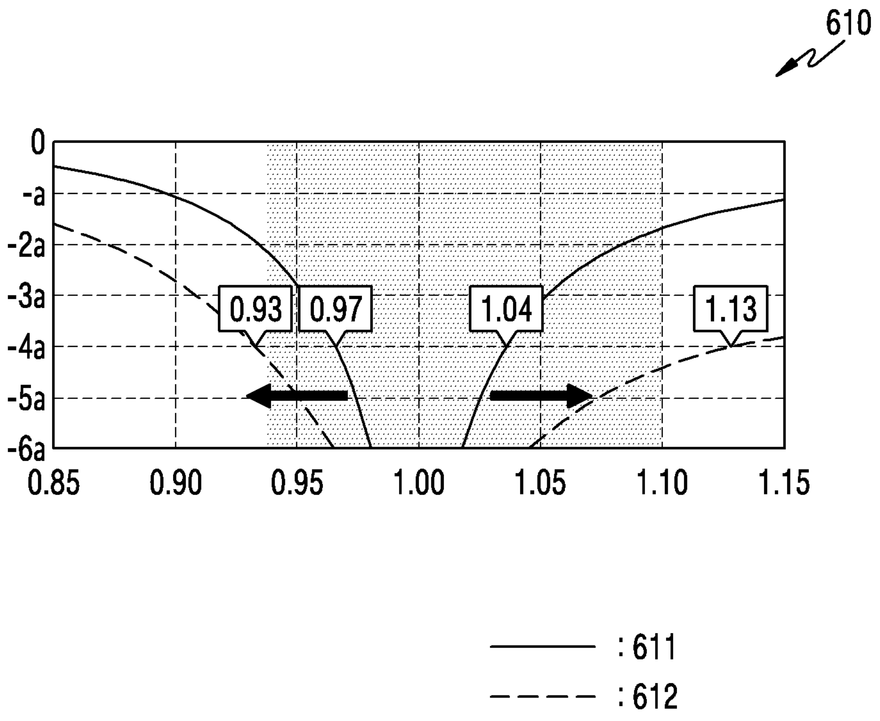
FIGS. 6A, 6B, 6C, and 6D depict graphs indicating antenna performance of an antenna having a gap patch structure according to various embodiments of the disclosure.

Referring to FIG. 6A, a first graph 610 indicates return loss performance of the antenna according to an embodiment of the disclosure. The horizontal axis indicates an operating frequency (i.e., a frequency band, unit: GHz) and the vertical axis indicates a return loss. A first line 611 indicates a return loss of a conventional antenna (e.g., a narrowband antenna), and a second line 612 indicates a return loss of the antenna having the gap patch structure according to embodiments of the disclosure. It is identified that a width of a frequency band having a certain return loss or less in the second line 612 is formed to be wider than a width of a frequency band having a certain return loss or less in the first line 611. This may mean that it shows broadband characteristics within a band. Since the bandwidth is stably formed even in the broadband, it is identified that in case of antenna tilting (scanning) through the antenna having the gap patch structure, a relatively wide coverage may be secured.

Figure 6B:
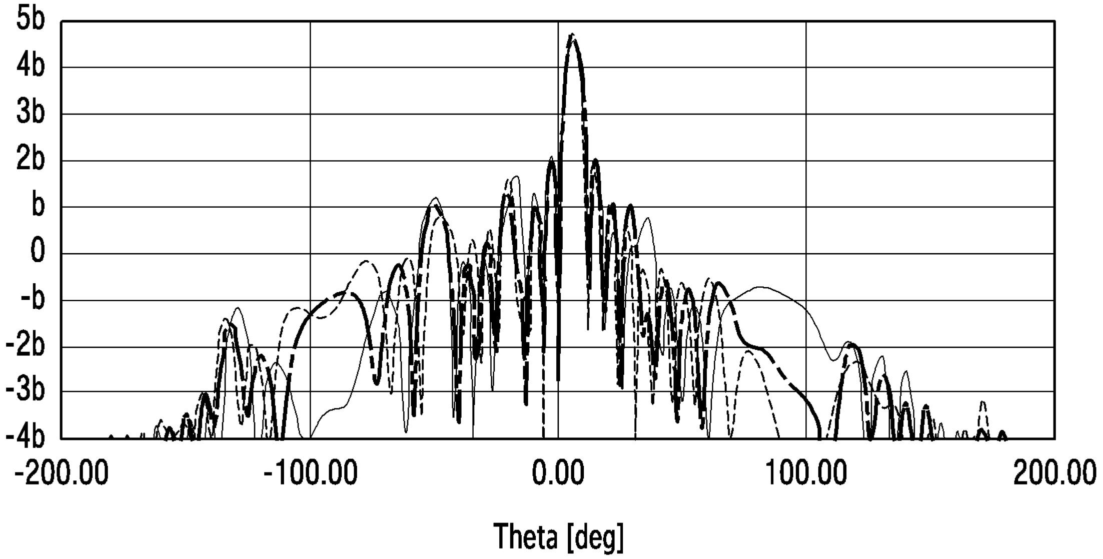

Referring to FIG. 6B, a second graph 620 indicates return loss performance of the antenna according to an embodiment of the disclosure. The horizontal axis indicates a beam angle (unit: deg (degree)) and the vertical axis indicates a gain (unit: dB (decibel)). Referring to the second graph 620, it is identified that a grating lobe (e.g., 10 dB or more) does not occur.

Figure 6C:
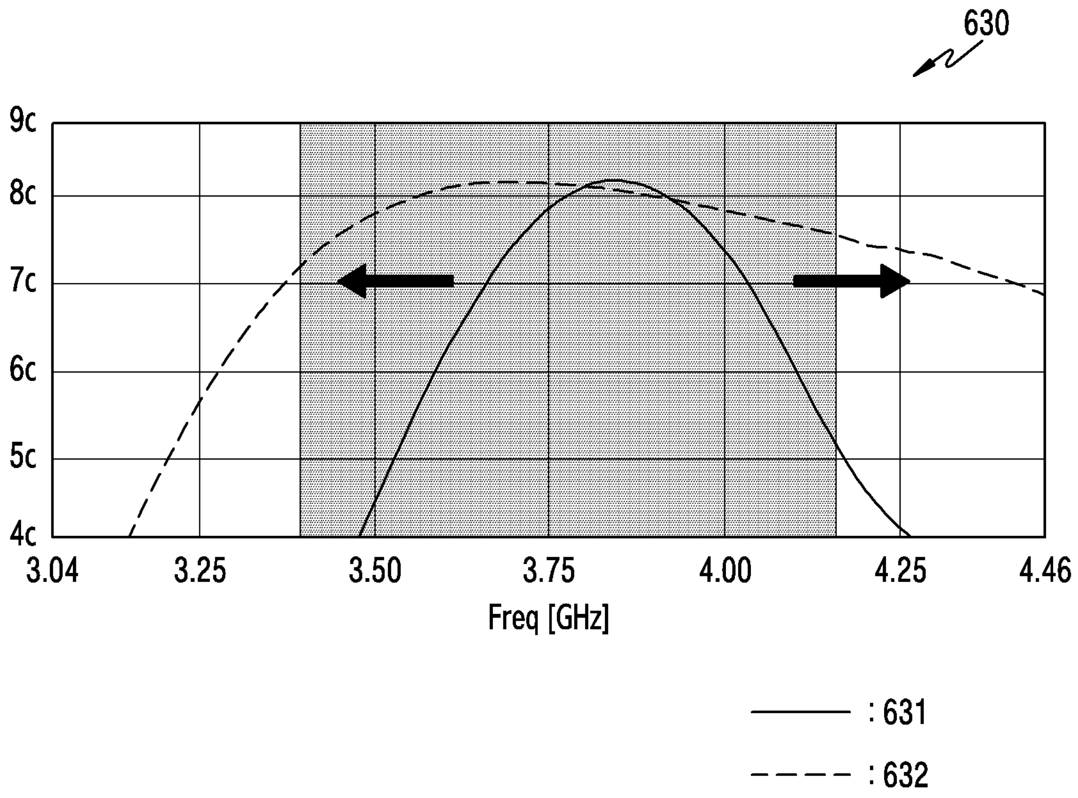

Referring to FIG. 6C, a third graph 630 indicates a gain of the antenna according to an embodiment of the disclosure. The horizontal axis indicates an operating frequency (i.e., a frequency band, unit: GHz) and the vertical axis indicates an antenna gain (unit: dB) loss. A first line 631 indicates a return loss of a conventional antenna (e.g., a narrowband antenna), and a second line 632 indicates a return loss of the antenna having the gap patch structure according to embodiments of the disclosure. It may be identified that even if an operating frequency is changed, an antenna gain is maintained constant in a relatively wide range in the second line 632 than in the first line 631. Specifically, it is identified that in the first line 631, a gain decreases relatively rapidly whenever a frequency moves based on the center frequency (about 3.8 GHZ). It is identified that a band with more than a predetermined amount of gain in the first line 631 is about 370 MHz. However, in the second line 632, a gain decreases relatively less rapidly as a frequency moves. It is identified that a band with more than a predetermined amount of gain in the second line 632 is about 1050 MHz. The antenna having the gap patch structure may maintain a high gain in a wide band, form a strong field, and have a less dielectric loss due to the air gap, thus providing high efficiency. Therefore, the antenna having the gap patch structure may be used for a broadband service.

Figure 6D:
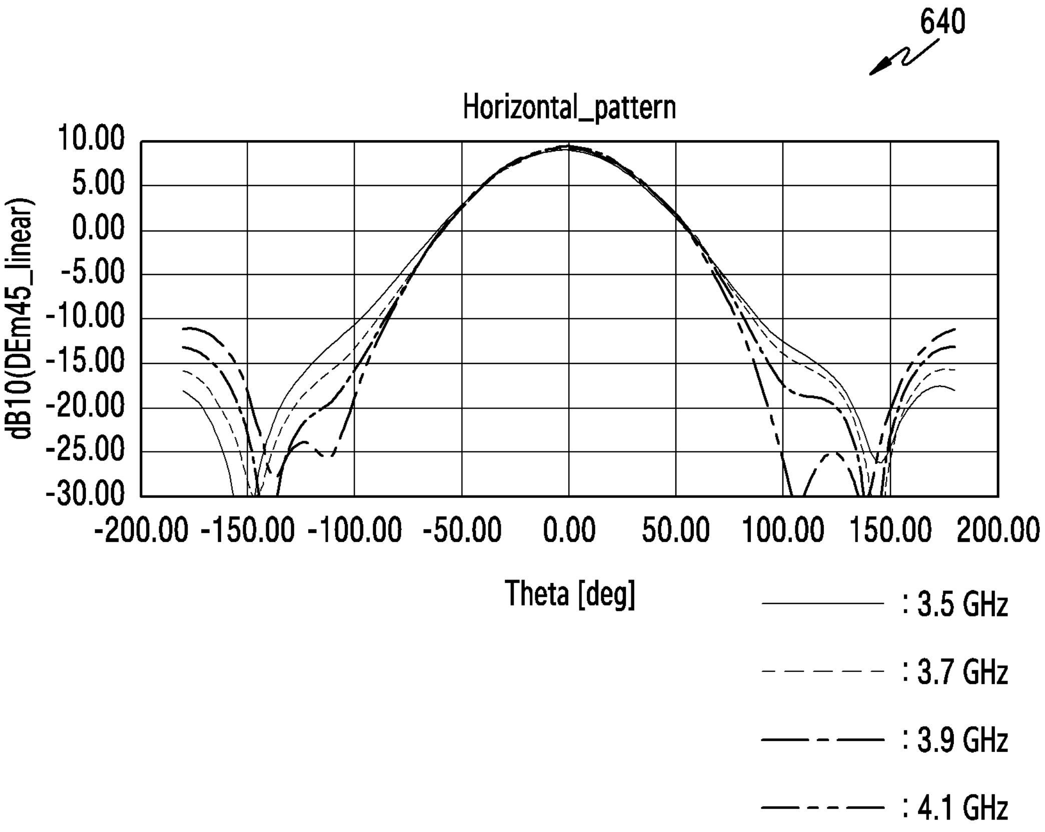

Referring to FIG. 6D, a fourth graph 640 indicates a pattern of the antenna according to an embodiment of the disclosure. In the fourth graph 640, an antenna pattern indicates a horizontal beam pattern of a single antenna element. The horizontal axis indicates a beam angle (unit: deg) and the vertical axis indicates a gain (unit: dB). A first line 641 indicates an antenna pattern in the 3.5 GHz band. A second line 642 indicates an antenna pattern in the 3.7 GHz band. A third line 643 indicates an antenna pattern in the 3.9 GHz band. A fourth line 644 indicates an antenna pattern in the 4.1 GHz band. Referring to the fourth graph 640, it is identified that a stable beam pattern is formed in a broadband.

FIGS. 7A, 7B, 7C, and 7D illustrate examples of an antenna having a gap patch structure according to various embodiments of the disclosure. The gap patch structure means a structure in which a region without a dielectric is secured in a section between a feeding circuit and a radiator of an antenna, that is, a coupling section.

Before describing FIGS. 7A to 7D, a feeding method is defined. Indirect feeding means a feeding method in a structure in which an air gap or a dielectric exists between a radiator and a feeding circuit. Hereinafter, a gap patch structure according to a direct feeding method will be exemplified through FIGS. 7A and 7B. The direct feeding method means a feeding method of a structure in which a radiator and a feeding circuit are directly connected. Hereinafter, a gap patch structure according to a direct feeding method will be exemplified through FIGS. 7C and 7D.

Figure 7A:
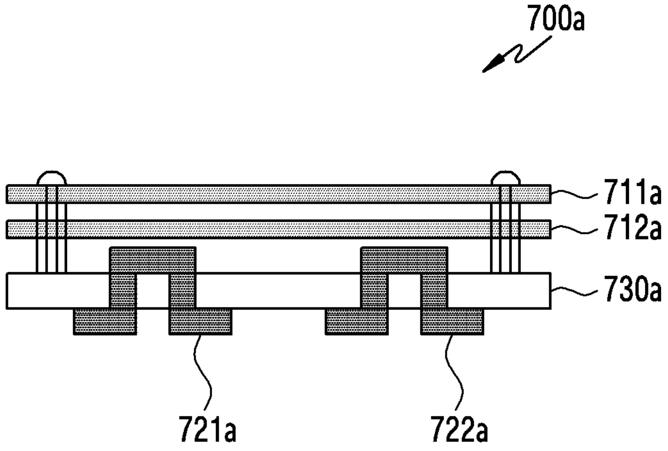
FIGS. 7A, 7B, 7C, and 7D illustrate examples of an antenna having a gap patch structure according to various embodiments of the disclosure.

Referring to FIG. 7A, a gap patch antenna 700*a* may include a first patch 711*a*, a second patch 712*a*, a first feeding structure 721*a*, a second feeding structure 722*a*, and a dielectric 730*a*. Here, by way of example, the first patch 711*a* and the second patch 712*a* may include a metal. In addition, by way of example, the first feeding structure 721*a* and the second feeding structure 722*a* may include a metal. The dielectric 730*a* may be inserted between the first feeding structure 721*a* and the second feeding structure 722*a* shown in the drawing. Based on FIG. 7A, the first patch 711*a* may be disposed on the first feeding structure 721*a*, the second feeding structure 722*a*, and the dielectric 730*a*. The second patch 712*a* may be disposed on the first patch 711*a*.

According to an embodiment, the first patch 711*a* may be disposed spaced apart from both the first feeding structure 721*a* and the second feeding structure 722*a*. That is, a gap may be formed between the first patch 711*a* and a feeding circuit (the first feeding structure 721*a* and the second feeding structure 722*a*). In addition, the second patch 712*a* and the first patch 711*a* may be disposed on positions spaced apart from each other. In other words, a gap may exist between the second patch 712*a* and the first patch 711*a* to form an air gap. The gap patch antenna 700*a* may have a structure including an air gap between the first patch 711*a* and the feeding circuit and an air gap between the second patch 712*a* and the first patch 711*a*.

Figure 7B:
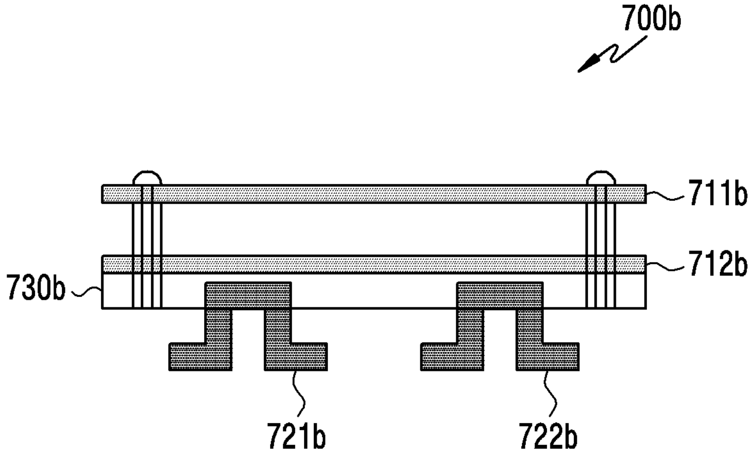

Referring to FIG. 7B, a gap patch antenna 700*b* may include a first patch 711*b*, a second patch 712*b*, a first feeding structure 721*b*, a second feeding structure 722*b*, and a dielectric 730*b*. Here, by way of example, the first patch 711*b* and the second patch 712*b* may include a metal. In addition, by way of example, the first feeding structure 721*b* and the second feeding structure 722*b* may include a metal. The dielectric 730*b* may be inserted on the first feeding structure 721*b* and the second feeding structure 722*b* shown in the drawing. Based on FIG. 7B, the dielectric 730*b* may be disposed on the first patch 711*b*. The second patch 712*b* may be disposed on the first patch 711*b*.

According to an embodiment, the first patch 711*b* may be disposed spaced apart from the feeding circuit (the first feeding structure 721*b* and the second feeding structure 722*b*) and the dielectric 730*b* may be inserted therebetween. That is, a gap is not formed between the first patch 711*b* and the feeding circuit (the first feeding structure 721*b* and the second feeding structure 722*b*). However, the second patch 712*b* and the first patch 711*b* may be disposed on positions spaced apart from each other. In other words, a gap may exist between the second patch 712*b* and the first patch 711*b* to form an air gap. The gap patch antenna 700*b* may have a structure including an air gap between the second patch 712*b* and the first patch 711*b*.

Figure 7C:
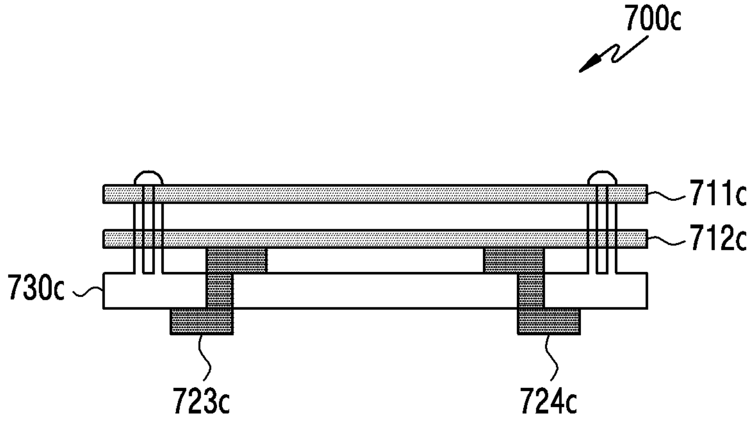

Referring to FIG. 7C, a gap patch antenna 700*c* may include a first patch 711*c*, a second patch 712*c*, a third feeding structure 723*c*, a fourth feeding structure 724*c*, and a dielectric 730*c*. Here, by way of example, the first patch 711*c* and the second patch 712*c* may include a metal. In addition, by way of example, the third feeding structure 723*c* and the fourth feeding structure 724*c* may include a metal. The dielectric 730*c* may be inserted between the third feeding structure 723*c* and the fourth feeding structure 724*c* shown in the drawing. The third feeding structure 723*c* and the fourth feeding structure 724*c* may be directly connected to the first patch 711*c*. That is, the first patch 711*c* receive a signal in a direct feeding method. In some embodiments, according to direct connection, the feeding structure may have a "¬" shape. The "¬" shape is shown in FIG. 7C, but this is merely an embodiment, and the disclosure is not limited thereto. The feeding structure shown in the drawing may be substituted with a structure having a "⊏" shape.

Based on FIG. 7C, the second patch 712*c* may be disposed on the first patch 711*c*. According to an embodiment, the first patch 711*c* may be directly fed with the feeding circuit (the first feeding structure 721*c* and the second feeding 722*c*). The dielectric 730*c* may be disposed under a coupling part. However, the second patch 712*c* and the first patch 711*c* may be disposed on positions spaced apart from each other. In other words, a gap may exist between the second patch 712*c* and the first patch 711*c* to form an air gap. The gap patch antenna 700*c* may have a structure including an air gap between the second patch 712*c* and the first patch 711*c*.

Figure 7D:
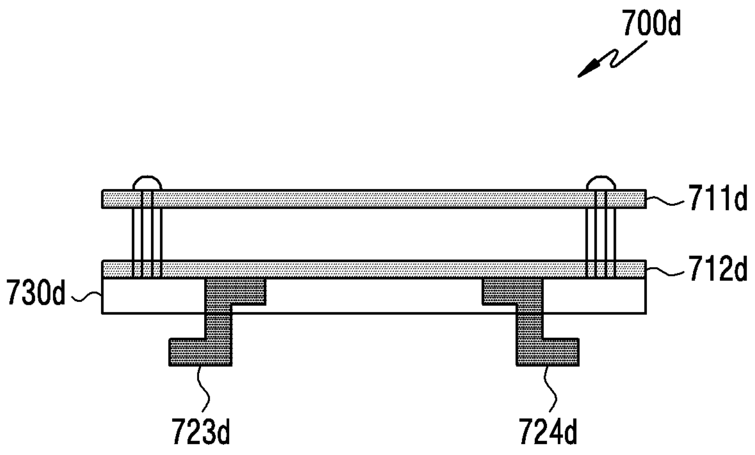

Referring to FIG. 7D, a gap patch antenna 700*d* may include a first patch 711*d*, a second patch 712*d*, a third feeding structure 723*d*, a fourth feeding structure 724*d*, and a dielectric 730*d*. Here, by way of example, the first patch 711*d* and the second patch 712*d* may include a metal. In addition, by way of example, the third feeding structure 723*d* and the fourth feeding structure 724*d* may include a metal. The dielectric 730*d* may be inserted between the third feeding structure 723*d* and the fourth feeding structure 724*d* shown in the drawing. The third feeding structure 723*d* and the fourth feeding structure 724*d* may be directly connected to the first patch 711*d*. That is, the first patch 711*d* receive a signal in a direct feeding method. In some embodiments, according to direct connection, the feeding structure may have a "¬" shape. The "¬" shape is shown in FIG. 7D, but this is merely an embodiment, and the disclosure is not limited thereto. The feeding structure shown in the drawing may be substituted with a structure having a "⊏" shape.

Based on FIG. 7D, the second patch 712*d* may be disposed on the first patch 711*d*. According to an embodiment, the first patch 711*d* may be directly fed with the feeding circuit (the first feeding structure 721*d* and the second feeding 722*d*). In addition, the dielectric 730*d* may be coupled with the first patch 711*d*. However, the second patch 712*d* and the first patch 711*d* may be disposed on positions spaced apart from each other. In other words, a gap may exist between the second patch 712*d* and the first patch 711*d* to form an air gap. The gap patch antenna 700*d* may have a structure including an air gap between the second patch 712*d* and the first patch 711*d*.

Through FIGS. 7A to 7D, examples of various types of antennas having the gap patch structure have been described. However, the examples of FIGS. 7A to 7D are merely examples modified from the antenna structure designed through the support for forming the air gap between the radiator (e.g., a radiation patch) and the feeding circuit and are not construed to limit embodiments of the disclosure. As long as an antenna structure in which a radiator and a feeding circuit are fixed through a structure and the radiator and the feeding circuit form an air gap, the antenna structure may be understood as an embodiment of the disclosure. That is, as one or more combination using an air gap and a dielectric, all structures to which a patch is added may also correspond to embodiments of the disclosure.

Figure 8:
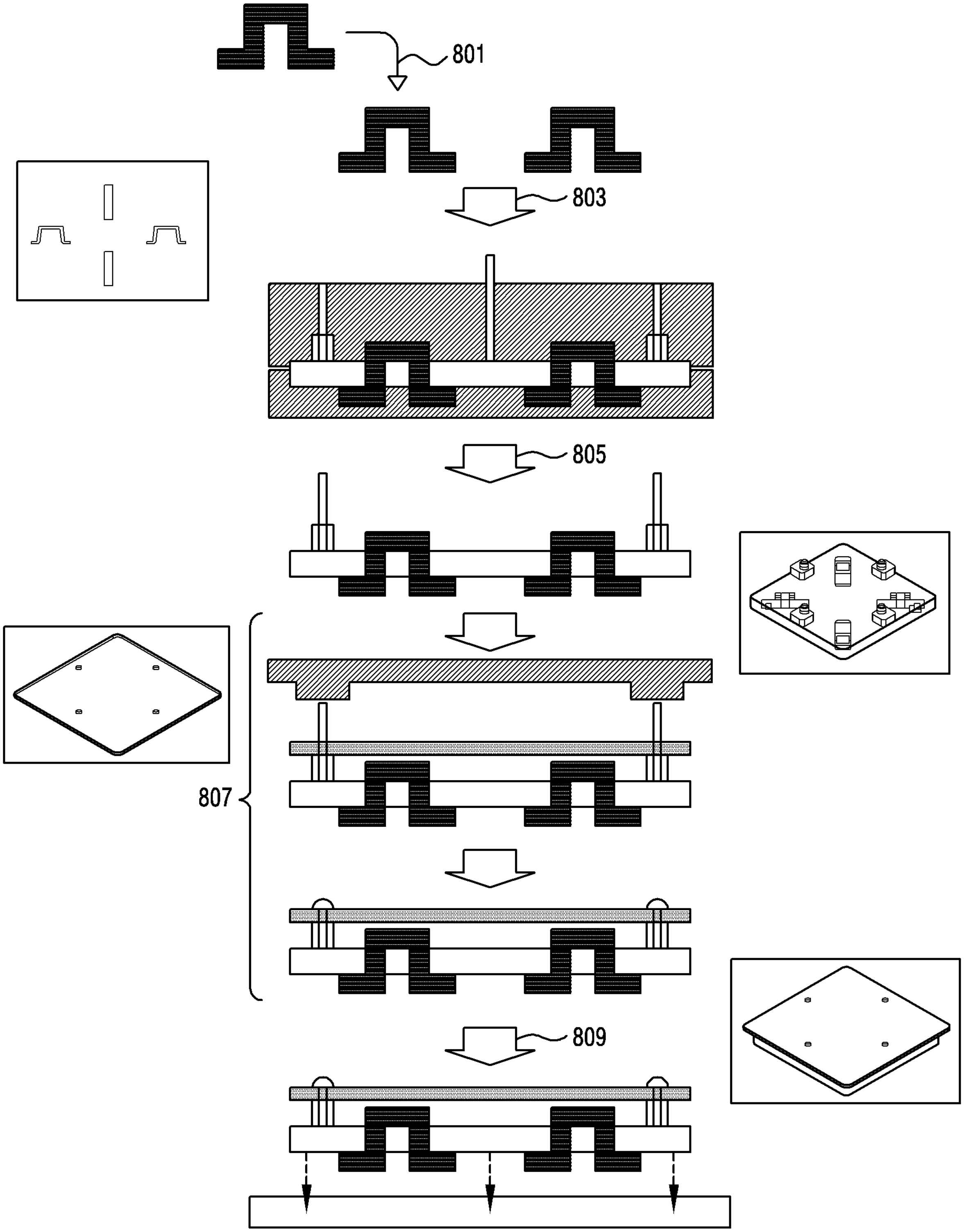
FIG. 8 illustrates an example of a design process of an antenna having a gap patch structure according to an embodiment of the disclosure.

FIG. 8 illustrates an example of a design process of an antenna having a gap patch structure according to an embodiment of the disclosure. The gap patch structure means a structure in which a region without a dielectric is secured in a section between a feeding circuit and a radiator of an antenna, that is, a coupling section. Although, the antenna 400 of FIG. 4 is exemplified as an antenna having a gap patch structure, in addition to the antennas of FIGS. 7A to 7D, the following descriptions may be applied in the same or similar manner to antennas forming the gap patch structure of the disclosure. The design process described in FIG. 8 is merely an embodiment of a process for designing the aforementioned gap patch antenna and thus the gap patch structure of the disclosure should not be construed as limiting that the structure is necessarily designed in the method shown in FIG. 8. That is, a part of structures forming the gap patch structure may be designed by a different process from the method illustrated in FIG. 8.

Referring to FIG. 8, an antenna module attachable to a PCB may be produced through a first process 801, a second process 803, a third process 805, a fourth process 807, and a fifth process 809.

The first process 801 may include an insert process. As an insert material, a leg-shaped support may be inserted into a mold. Here, a description for a leg-shaped support may correspond to not only a feeding leg functioning as a feeder but also a structure performing a simple supporter function. According to an embodiment, the leg-shaped support may include a metal or a plated material.

The second process 803 may include an injection molding process. The injection molding is a production process for producing a structure by injecting a molten material into a mold. The injection molding may be used for producing a body such as the support 415 of FIG. 4. Here, the body may correspond to an LCP body. During an injection molding process, a mold (hereinafter, a mold lower plate), a leg-shaped support, and a dielectric of the first process 801 may be inserted and a mold (hereinafter, a mold upper plate) corresponding to the body may be coupled thereto.

The third process 805 may include a process of removing molds coupled for injection molding. When the molds are removed, a structure in which the body and the leg-shaped structure (feeding circuit) are coupled is derived.

The fourth process 807 may include a press process. In the fourth process 807, the press process of attaching a patch to the structure derived by the third process 805 may be performed. In this case, the press may include a heat fusion press process. The press process may be performed so that a height at which the patch is fixed is formed to be higher than a height of the leg-shaped support (feeding leg). The patch may have a fixed height on a protrusion of the body through the heat fusion press. A press height of the patch may be designated to form the gap patch structure according to embodiments of the disclosure.

The fifth process 809 may include a process of coupling an antenna structure derived by the fourth process 807 to a PCB. The antenna structure may correspond to a structure in which an antenna radiator and a feeding circuit are coupled. In this case, a method for attaching the antenna structure to a PCB may include a process of attaching the leg-shaped support to the PCB through the SMT.

Figure 9:
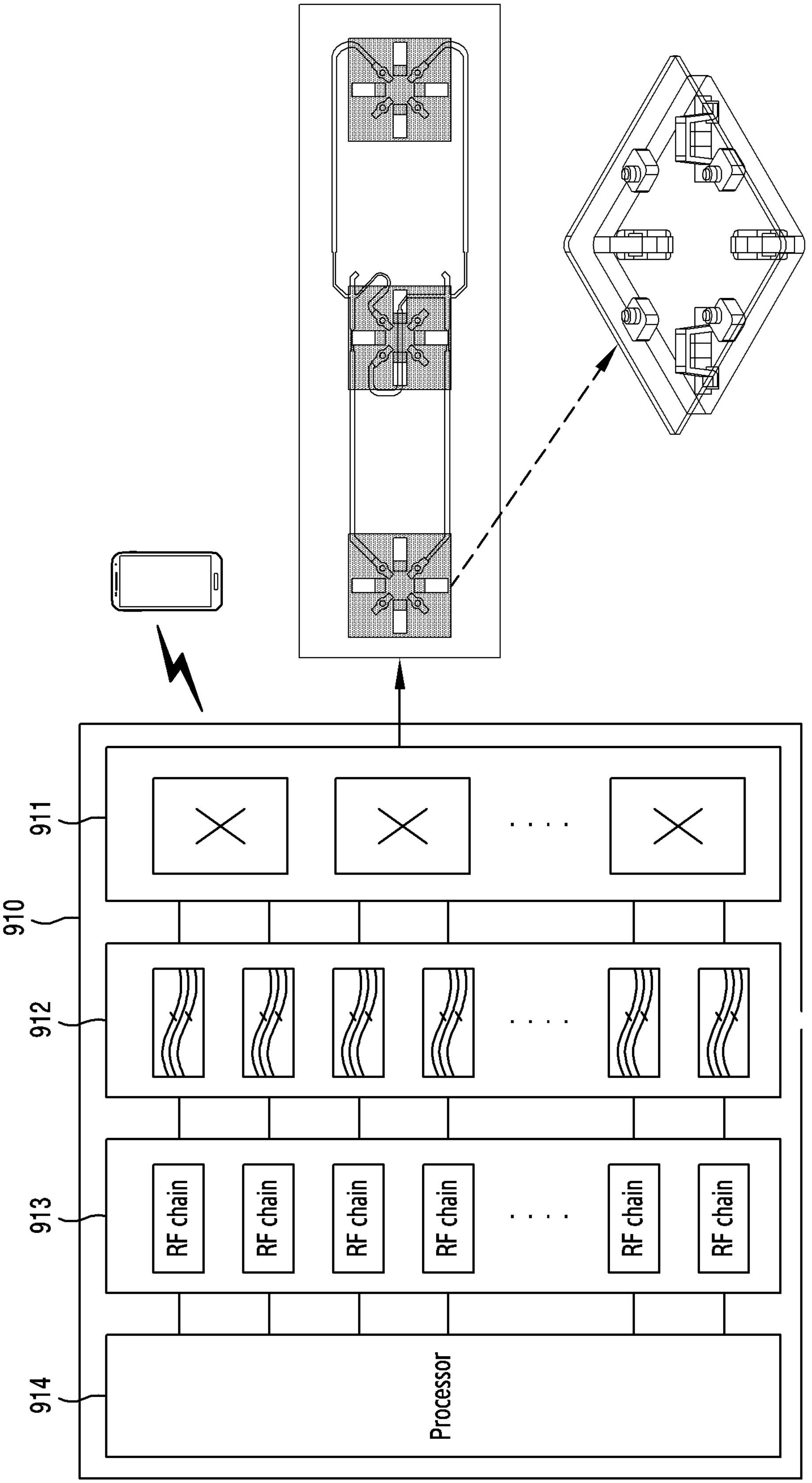
FIG. 9 illustrates a functional configuration of an electronic device including an antenna having a gap patch structure according to an embodiment of the disclosure.

FIG. 9 illustrates a functional configuration of an electronic device including an antenna having a gap patch structure according to an embodiment of the disclosure. The electronic device 910 may correspond to a base station 120 or a MMU of the base station 120 in FIG. 1. However, unlike the description above, the disclosure does not exclude a case that the electronic device 910 may be implemented in the terminal 110 in FIG. 1. The embodiments of the disclosure include the antenna structure mentioned with reference to FIGS. 1 to 5, 6A to 6D, 7A to 7D, and 8 as well as the electronic device including the antenna structure. The electronic device 910 may include an antenna element having the gap patch structure inside an antenna array.

FIG. 9 illustrates a functional configuration of the electronic device 910. The electronic device 910 may include an antenna unit 911, a filter unit 912, a radio frequency (RF) processor 913, and a processor 914.

The antenna unit 911 may include a plurality of antennas. The antenna performs functions for transmitting or receiving a signal through a wireless channel. The antenna may include a radiator formed of a conductor or a conductive pattern formed on a substrate (for example, a PCB). The antenna may radiate an up-converted signal on a wireless channel or obtain a signal radiated by other devices. Each antenna may be referred to as an antenna element or an antenna component. In some embodiments, the antenna unit 911 may include an antenna array in which a plurality of antenna elements form an array. The antenna unit 911 may be electrically connected to the filter unit 912 through RF signal lines. The antenna unit 911 may be mounted on a PCB including a plurality of antenna elements. The PCB may include a plurality of RF signal lines for connecting each antenna element and the filter unit 912. The RF signal lines may be referred to as feeding networks. The antenna unit 911 may provide a received signal to the filter unit 912 or radiate a signal provided by the filter unit 912 into the air. The antenna unit 911 according to embodiments of the disclosure may include an antenna element having a gap patch structure. As described with reference to FIGS. 1 to 5, 6A to 6D, 7A to 7D, and 8, the gap patch structure indicates an antenna structure designed through a supporter for forming an air gap between a radiator (e.g., a patch antenna) and a feeding circuit. Although, the antenna 400 of FIG. 4 is exemplified as an antenna having a gap patch structure in FIG. 9, in addition to the antennas of FIGS. 7A to 7D, the following descriptions may be applied in the same or similar manner to antennas forming the gap patch structure of the disclosure.

The filter unit 912 may perform filtering for transferring a signal of a desired frequency. The filter unit 912 may perform a function to selectively identify a frequency by generating a resonance. The filter unit 912 may include at least one of a band pass filter, a low pass filter, a high pass filter, or a band reject filer. That is, the filter unit 912 may include RF circuits for obtaining signals in a frequency band for transmission or a frequency band for reception. The filter unit 912 according to various embodiments may electrically connect the antenna unit 911 and the RF processor 913.

The RF processor 913 may include a plurality of RF paths. An RF path may be a unit of path through which a signal received through an antenna or a signal radiated through an antenna passes. At least one RF path may be referred to as an RF chain. The RF chain may include a plurality of RF elements. The RF elements may include an amplifier, a mixer, an oscillator, a digital-to-analog converter (DAC), an analog-to-digital converter (ADC), and the like. For example, the RF processor 913 may include an up converter for up-converting a digital transmission signal in a base band into a transmission frequency and a digital-to-analog converter for converting an up-converted digital transmission signal into an analog RF transmission signal.

The up converter and the DAC form a portion of a transmission path. The transmission path may further include a power amplifier (PA) or a coupler (or combiner). In addition, for example, the RF processor 913 may include an analog-to-digital converter (ADC) for converting an analog RF reception signal into a digital reception signal and a down converter for down-converting a digital reception signal into a digital reception signal in a ground band. The ADC and the down converter form a portion of a reception path. The reception path may further include a low-noise amplifier (LNA) or a coupler (or divider). RF components of the RF processor may be implemented on a PCB. The base station 910 may include a structure in which the antenna unit 911, the filter unit 912, and the RF processor 913 are sequentially stacked. Antennas and RF components of the RF processor may be implemented on a PCB and PCBs and filters between PCBs may be repeatedly coupled to each other to form a plurality of layers.

The processor 914 may control general operations of the electronic device 910. The processor 914 may include various modules for performing communication. The processor 914 may include at least one processor such as a modem. The processor 914 may include modules for digital signal processing. For example, the processor 914 may include a modem. When transmitting data, the processor 914 may generate complex symbols by coding and modulating a transmission bit stream. In addition, for example, when data is received, the processor 914 may restore a bit stream by demodulating and decoding a baseband signal. The processor 914 may perform functions of a protocol stack required by a communication standard.

Referring to FIG. 9, a functional configuration of the electronic device 910 is described as equipment for which the antenna structure of the disclosure may be utilized. However, the example shown in FIG. 10 is merely a configuration for the utilization of the antenna structure according to various embodiments of the disclosure described through FIGS. 1 to 5, 6A to 6D, 7A to 7D, and 8, and the embodiments of the disclosure are not limited to the components of the equipment shown in FIG. 10. Accordingly, an antenna module including an antenna structure, other type of communication equipment, and an antenna structure itself may also be understood as embodiments of the disclosure.

According to various embodiments of the disclosure, an antenna device in a wireless communication system may include a radiator, a body, and a feeding circuit for transmitting a signal, wherein the radiator is coupled to at least a part of the body, the feeding circuit is coupled to the body to support the body, and the radiator is disposed to be spaced apart from the feeding circuit to form an air gap (air gap).

According to an embodiment, the antenna device may further include a printed circuit board (PCB) coupled to the feeding circuit.

According to an embodiment, in the antenna device, the feeding circuit may be coupled to the PCB through a surface mounted technology (SMT).

According to an embodiment, the feeding circuit may include a plurality of leg structures and feeding of a first feeding leg structure and feeding of a second feeding leg structure, among a plurality of leg structures, may be configured to form a dual polarization.

According to an embodiment, the antenna device may further include an additional leg structure for supporting the body.

According to an embodiment, in the antenna device, the radiator may include a radiation patch, a first surface of the radiation patch may be coupled to at least a part of the body, and the first surface of the radiation patch may be disposed spaced apart from the feeding circuit.

According to an embodiment, in the antenna device, the body may include a dielectric, at least a part of the body may include a protrusion formed to be longer than a height of the dielectric, and the height of the dielectric may be lower than that of the feeding circuit.

According to an embodiment, the antenna device may correspond to an antenna element of a sub-array.

According to an embodiment, each of the radiator and the feeding circuit may be formed through at least one method of injection molding, a mold, or a three-dimensional (3D) printer.

According to an embodiment, the body may be formed through injection molding.

According to an embodiment, in the antenna device, the feeding circuit may be configured to transfer an electric signal to the radiator through coupling feeding.

According to an embodiment, in the antenna device, the feeding circuit and the radiator may be arranged to form a structure in which a dielectric is not disposed between the feeding circuit and the radiator.

According to an embodiment, the body may comprise dielectric that fixes the feeding circuit.

According to an embodiment, at least one of the radiator or feeding circuit may be formed of metal.

According to an embodiment, the antenna device may further include an additional radiator, the additional radiator may be disposed between the radiator and the feeding circuit, the additional radiator and the radiator may be arranged spaced apart from each other to form a first air gap, and the additional radiator and the feeding circuit may be arranged spaced apart from each other to form a second air gap.

According to an embodiment, the antenna device may further include an additional radiator, the additional radiator may be disposed between a radiator and the dielectric of the body, and the additional radiator and the radiator may be arranged spaced apart from each other to form the air gap.

According to an embodiment, the antenna device may further include an additional radiator, the additional radiator may be directly connected to the feeding circuit, and the additional radiator and the radiator may be arranged spaced apart from each other to form the air gap.

According to various embodiments of the disclosure, a massive multiple input multiple output (MIMO) unit (MMU) device may include at least one processor, a feeding network, and a sub-array including a plurality of antenna elements, wherein each of the antenna elements of the sub-array includes a body, a radiator coupled to at least a part of the body, and a feeding circuit coupled to the body to support the body, and the radiator is disposed to be spaced apart from the feeding circuit to form an air gap (air gap).

According to an embodiment, the feeding network may include a power divider and the power divider may be configured to control a phase of a signal transferred to the sub-array through adjustment of a length of a line.

According to an embodiment, the MMU device may further include a printed circuit board (PCB) for the feeding network and the sub-array.

According to an embodiment, the body of each of the antenna elements may include a dielectric and the dielectric may be disposed on a location to have a height lower than a height of the feeding circuit.

In the above-described embodiments, the radiation patch is described as an example of a radiator. However, the radiation patch antenna is merely an example and other radiation structure having the same technical meaning may be used interchangeably.

The antenna device of the disclosure may provide an excellent broadband characteristic through the gap patch antenna structure described above, that is, an air gap formed between a radiator and a feeding circuit. The broadband characteristic may allow a communication channel capacity to be improved and cause improvement in coverage and throughput due to stable beam performance. Furthermore, the integrated structure of a radiator and a support may cause reduction in costs (manufacturing cost, tolerance reduction, or the like) required for manufacturing and coupling. In addition, an antenna module may be formed in an integrated structure with a PCB through the SMT and thus an effect of massive production in a beamforming device requiring a plurality of antenna elements may be maximized. Implementation of the disclosure may be ascertained according to an air gap formed under a radiation patch in an antenna element of a beamforming device.

The methods according to embodiments described in the claims or the specification of the disclosure may be implemented by hardware, software, or a combination of hardware and software.

When the methods are implemented by software, a non-transitory computer-readable storage medium for storing one or more programs (software modules) may be provided. The one or more programs stored in the non-transitory computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory (RAM) and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna device in a wireless communication system, the antenna device comprising:
- an antenna element;
- a plurality of feeding structures for transferring signals to the antenna element, wherein the plurality of feeding structures include a first feeding structure for a first polarization and a second feeding structure for a second polarization; and
- a dielectric including a first portion in which the plurality of feeding structures are inserted and a second portion protruding from the first portion for supporting the antenna element,
- wherein each of the first feeding structure and the second feeding structure is inserted into the first portion of the dielectric to be fixed, and
- wherein the antenna element is disposed spaced apart from the plurality of feeding structures to form an air gap.

2. The antenna device of claim 1, further comprising:
- a printed circuit board (PCB) coupled to the plurality of feeding structures.

3. The antenna device of claim 2, wherein
- the plurality of feeding structures are coupled to the PCB through a surface mounted technology (SMT).

4. The antenna device of claim 1, further comprising:
- an additional structure for supporting the dielectric.

5. The antenna device of claim 1, wherein the antenna element comprises
- a patch for radiating the signals, wherein
- a first face of the patch is coupled to the second portion of the dielectric, and wherein
- the first face of the patch is disposed spaced apart from the plurality of feeding structures.

6. The antenna device of claim 1, wherein
- the second portion of the dielectric is formed to have a height longer than a height of the first portion of the dielectric, and wherein
- the height of the first portion is lower than a height of the plurality of feeding structures.

7. The antenna device of claim 6, wherein
- an interval between the height of the second portion and the height of the plurality of feeding structures corresponds to the air gap.

8. The antenna device of claim 6, wherein
- the height of the plurality of feeding structures, the height of the first portion, and the height of the second portion are referenced with a face of the dielectric.

9. The antenna device of claim 1, wherein
- the plurality of feeding structures and the antenna element are arranged to form a structure in which a dielectric is not disposed between the plurality of feeding structures and the antenna element.

10. The antenna device of claim 1, further comprising:
- an additional antenna element, wherein
- the additional antenna element is disposed between the antenna element and the plurality of feeding structures, wherein
- the additional antenna element and the antenna element are arranged spaced apart from each other to form a first air gap, and wherein
- the additional antenna element and the plurality of feeding structures are arranged spaced apart from each other to form a second air gap.

11. The antenna device of claim 1, further comprising:
an additional antenna element, wherein
the additional antenna element is disposed between the antenna element and the first portion of the dielectric, and wherein
the additional antenna element and the antenna element are arranged spaced apart from each other to form an air gap.

12. The antenna device of claim 1, further comprising:
an additional antenna element,
wherein the additional antenna element is directly connected to the plurality of feeding structures, and wherein
the additional antenna element and the antenna element are arranged spaced apart from each other to form an air gap.

13. The antenna device of claim 1, wherein
the signals are transferred to the antenna element via a coupling feeding.

14. A massive multiple input multiple output (MIMO) unit (MMU) device comprising:
at least one processor; and
a sub-array comprising:
a body, and a plurality of antenna elements including an antenna element,
a plurality of feeding structures for transferring signals to the antenna element, wherein the plurality of feeding structures include a first feeding structure for a first polarization and a second feeding structure for a second polarization, and
a dielectric comprising a first portion in which the plurality of feeding structures are inserted and a second portion protruding from the first portion for supporting the antenna element, wherein
each of the first feeding structure and the second feeding structure is inserted into the first portion of the dielectric to be fixed, and wherein
the antenna element of the plurality of antenna elements is disposed spaced apart from the plurality of feeding structures to form an air gap.

15. The MMU device of claim 14, further comprising:
a power divider configured to control a phase of a signal transferred to the sub-array.

16. The MMU device of claim 14, further comprising:
a printed circuit board (PCB) coupled to the plurality of feeding structures.

17. The MMU device of claim 14, wherein
the first portion of the dielectric has a height lower than a height of the plurality of feeding structures.

* * * * *